United States Patent [19]

Ogura

[11] Patent Number: 4,643,516

[45] Date of Patent: Feb. 17, 1987

[54] LASER BEAM SCANNING APPARATUS

[75] Inventor: Yukio Ogura, Yokohama, Japan

[73] Assignee: Ricoh Company, Ltd., Japan

[21] Appl. No.: 463,408

[22] Filed: Feb. 3, 1983

[30] Foreign Application Priority Data

Feb. 5, 1982 [JP] Japan ................................. 57-17291
May 1, 1982 [JP] Japan ................................. 57-73872

[51] Int. Cl.⁴ .......................................... G02B 26/10
[52] U.S. Cl. ...................................... 350/6.5; 350/6.8
[58] Field of Search ..................... 350/6.5, 6.8, 3.71, 350/6.4; 356/387

[56] References Cited

U.S. PATENT DOCUMENTS 3,853,406 12/1974 Zanoni ................................ 356/387

FOREIGN PATENT DOCUMENTS 0088016 7/1980 Japan ................................. 350/6.8

Primary Examiner—John K. Corbin
Assistant Examiner—Rebecca D. Gass
Attorney, Agent, or Firm—Guy W. Shoup

[57] ABSTRACT

In laser beam scanning by a rotating polygonal mirror, a hologram scanner, etc., a cylindrical lens having a refractive power in a sub-scanning direction is introduced to place the beam deflecting surface and the scanning surface in a geometrical-optically conjugative relation, in order to prevent occurrence of a deviation in position of scanning line due to a deviation of the beam deflecting surface. However, in a Gauss beam such as a laser beam, a beam waist is not produced in a geometrical-optical conjugate point. This relation is utilized to select optical elements whereby apparatus may be miniaturized and the size of the beam spot may be adjusted.

1 Claim, 8 Drawing Figures

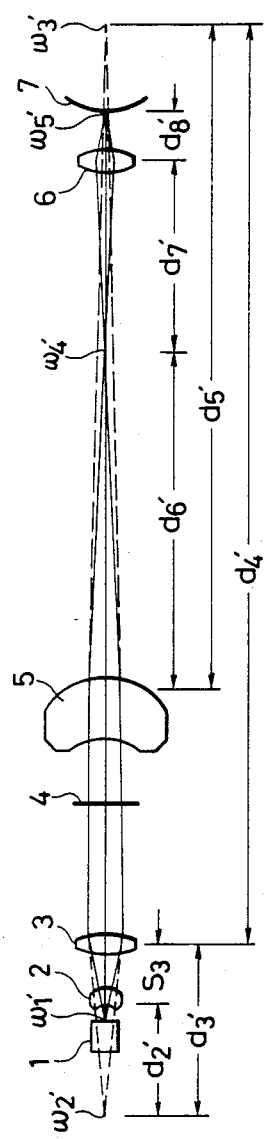
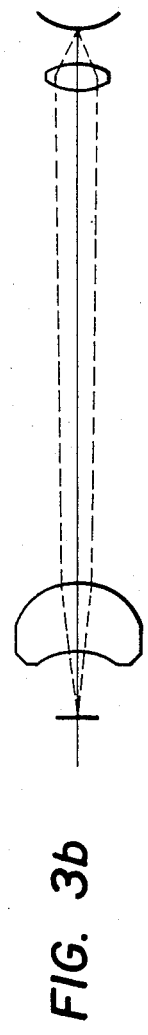
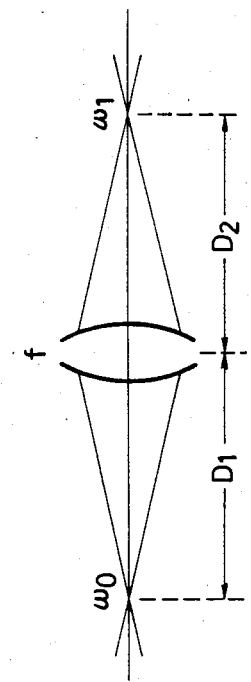
FIG. 3a
FIG. 3b
FIG. 4

LASER BEAM SCANNING APPARATUS

BACKGROUND OF THE INVENTION

1. Field of the Invention

The present invention relates to a light beam scanner which uses a semi-conductor laser as a light source and scans with a laser beam by means of a mechanical deflector such as a rotating polygonal mirror or the like.

2. Description of the Prior Art

In a light beam scanner using a rotating polygonal mirror as a light deflector, it is not possible to prevent the reflecting surfaces of the rotating polygonal mirror from being tilted relative to its rotating axis due to an error in manufacture, resulting in non-uniformity of scanning line pitch. If an attempt is made to remove such an error by improving the precision of the rotating polygonal mirror, an extremely high cost results.

For this reason, there have been introduced optical systems which have a so-called falling compensation function in which a reflecting surface and a scanning surface are placed in a geometrical-optically conjugative relation with respect to a focussing lens system, in a so-called sub-scanning direction, which is parallel with the rotating axis of the rotating mirror. In these optical systems, optical elements which are different in refractive power relative to the scanning surface and the surface perpendicular thereto, that is, a cylindrical lens or a toroidal lens, are introduced. The deflection surface and the surface to be scanned are placed in a conjugative relation with respect to a composite system of these lens systems and the focussing lens in a direction at a right angle to the scanning direction, that is, in a so-called sub-scanning direction. In this case, a condensing lens is disposed so that a light beam from the light source is condensed on the deflecting surface. On the other hand, the light from the light source is incident as a parallel light flux upon the deflecting surface, and the scanning surface is scanned by the rotation of the deflecting surface. For this reason, a cylindrical lens is also introduced into the condensing lens system, and generally a linear spot in a scanning direction is formed on the deflecting surface.

In the past, in the optical system as described above, the linear spot is necessarily formed on the deflecting surface as described above and, therefore, a fixed spacing is required between the light source and the deflector, which limits miniaturization of the apparatus.

On the other hand, there has been proposed an arrangement (Japanese Patent Application Laid-Open No. 59152/79) wherein a linear spot is not made on a reflecting surface but a cylindrical lens having a refractive power in a sub-scanning direction is arranged in front of a deflector to project emitting light fluxes on the deflecting surface in the sub-scanning direction. The light fluxes are made into substantially parallel light fluxes by a focussing lens, which are then focussed on the scanning surface by a convex cylindrical lens having a short focal distance.

In this proposal, the falling compensation effect merely utilizes the shortness of the focal distance of the convex cylindrical lens and therefore, the compensation effect is not perfect. In addition, the light source is limited to a laser which emits parallel light flux and cannot be used for a laser light source of spot luminescense such as a semi-conductor laser.

Further, in a Gauss beam such as a laser beam, when a parallel beam is incident on the lens, the relation between a radius $\omega_o$ of a beam waist at a focussing position and a radius $\omega_a$ of a beam incident on the lens is expressed by $$\omega_a = \frac{\lambda f}{\pi \omega_o} \quad (1)$$

where $\lambda$ is the wave length, and f is the focal length of the lens. Thus, it is necessary to adjust the radius of incident beam to $\omega_a$ in order to obtain a spot size $\omega_o$ as required. Also, referring to FIG. 4, the following relations are obtained:

$$\frac{1}{\omega_2^2} = \frac{1}{\omega_1^2}\left(1 - \frac{D_1}{f}\right)^2 + \frac{1}{f^2}\left(\frac{\pi \omega_1}{\lambda}\right)^2 \quad (2)$$

$$D_2 = f + (D_1 - f)\frac{f^2}{(D_1 - f)^2 + \left(\frac{\pi \omega_1^2}{\lambda}\right)^2} \quad (3)$$

where f is the focal length of the lens, $\omega_1$ is the radius of beam waist on the object side, $D_1$ is the position relative to the lens, $\omega_2$ is the radius of beam waist on the image side, and $D_2$ is the position thereof. Thus, the diameter of spot obtained on the scanning surface by the light source and the optical system is determined constant but if there is irregularity in emitting size, such as from a semi-conductor laser, the spot size of the beam on the scanning surface also results in irregularity. For this reason, it has been proposed to insert an afocal zoom lens system or the like into an optical system to control the spot size (for example, Japanese Patent Application Disclosure No. 56779/79). However, incorporation of two sets of cylindrical afocal zoom lenses in order to control the beam diameter in the main and sub scanning directions as described hereinbefore requires a number of cylindrical lenses, resulting in a higher cost and in a large-size scanning apparatus.

SUMMARY OF THE INVENTION

The present invention provides a light beam scanning apparatus which removes the disadvantages noted above while having a falling compensation function, in which in a so-called Gauss beam such as a laser beam, the positional relation of a beam waist conjugate to the lens is different from that of a geometrical optic as in the equation (3), the falling compensation function can be such that a deflection surface and a surface to be scanned are geometrically conjugate, and the fact that the beam waist is not necessarily on the deflection surface is utilized.

This invention further provides an optical system in which the aforesaid optical system for controlling a spot size comprises a prism in one direction and positive and negative cylindrical lenses in the other direction whereby the spot sizes in two directions may be independently controlled in a simple configuration.

BRIEF DESCRIPTION OF THE DRAWINGS

FIG. 3a is a view of a light path in a sub-scanning direction;

FIG. 3b shows the geometrical-optically conjugative relation of the deflecting surface and the surface to be scanned;

FIG. 4 is an explanatory view of focussing characteristic of a Gauss beam;

DETAILED DESCRIPTION OF THE PREFERRED EMBODIMENTS

The apparatus of the present invention will be described in detail with reference to the accompanying drawings.

Figure 1:
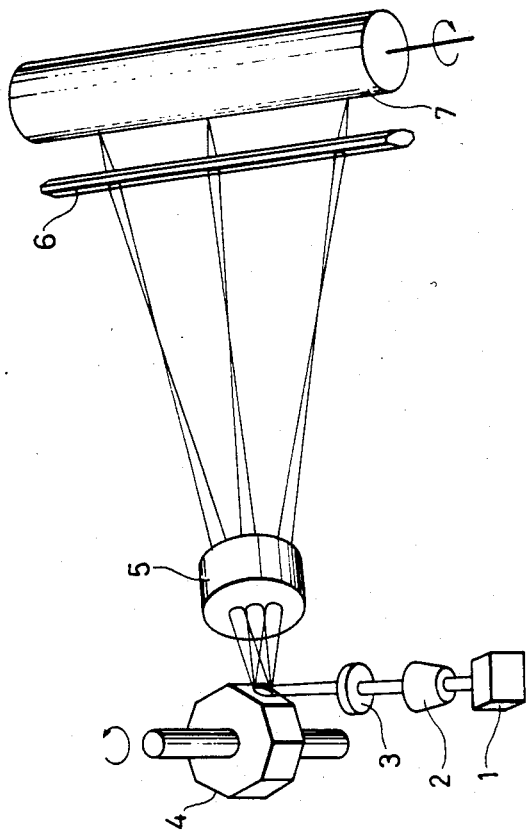
FIG. 1 is a perspective view of a principal portion of a light beam scanning apparatus in accordance with the present invention.

FIG. 1 is a perspective view of a principal portion of a scanning optical system in accordance with the present invention. A beam from a light source which emits a Gauss beam, a semi-conductor laser 1 in this embodiment, is subjected to condensing action by a coupling lens 2 and is incident on a deflector 4 such as a rotating polygonal mirror. A convex cylindrical lens 3 is arranged between the coupling lens 2 and the deflector 4, and the beam is incident on the deflector 4 as a diverging beam in a main scanning direction and as a condensing beam in a sub-scanning direction. The beam is reflected for scanning by rotation of the deflector 4 and is focussed on a surface 7 to be scanned in a main scanning direction by means of a focussing lens 5 having a $f\theta$ characteristic. It also gives rise to a beam waist and is then focussed on the surface 7 by means of a convex cylindrical lens 6 in a sub-scanning direction. Here, the deflecting surface and surface to be scanned are in a conjugative relation with respect to the systems of the focussing lens 5 and convex cylindrical lens 6 to prevent the spot position on the surface to be scanned from being varied in a sub-scanning direction by the falling of the deflecting surface.

Figure 2:
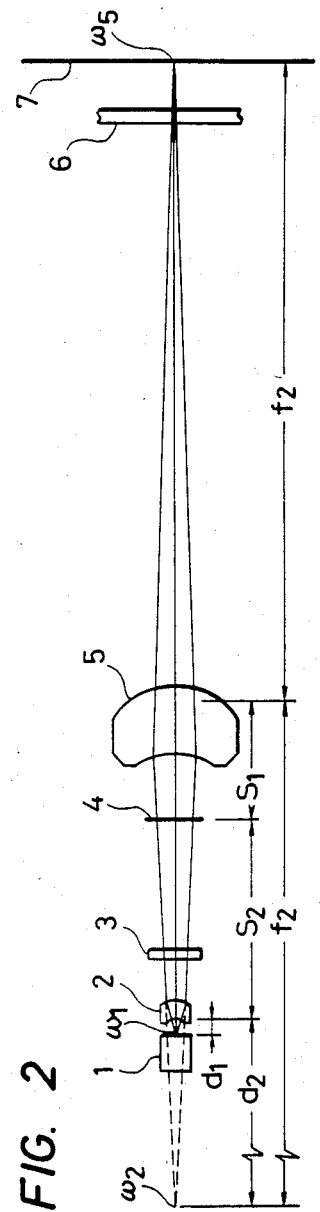
FIG. 2 is a view of a light path in a main scanning direction.

FIG. 2 shows a light path for the main scanning direction. The diverging beam from the semi-conductor laser is subjected to condensing action of the coupling lens 2 to form a diverging beam having an imaginary beam waist $\omega_2$ at a focal point position in front of the focussing lens 5.

In the Gauss beam optical system, the relations in the above-described equations (2) and (3) are established between f the focal length of the lens, $\omega_o$ the radius of the beam waist on the object side, $\omega_1$ the radius of the beam waist on the image side, and $D_1$, $D_2$ the positions of the beam waists.

Thus, the beam having a beam waist at the focal point in front of the focussing lens 5, that is, at the position of $D_1 = f$, is $D_2 = f$, and a beam waist occurs on the surface 7 to be scanned at the focal point at the rear. The cylindrical lenses 3 and 6 arranged in the light path have no refractive power in that direction.

FIG. 3a shows the light path in a sub-scanning direction. A laser beam is made to form an imaginary beam waist $\omega'_2$ by the coupling lens 2. The beam is made to form a beam waist $\omega'_3$ at a position beyond the surface to be scanned 7 by the convex cylindrical lens 3 having a refractive power in a sub-scanning direction. This condensing beam is further subjected to condensing action of the focussing lens 5 to form a beam waist $\omega'_4$, which beam waist is formed into the desired beam waist size on the surface to be scanned 7 by the convex cylindrical lens 6 and is focussed.

In this case, in the first cylindrical lens 3 and the second cylindrical lens 6, the refractive power and arrangement are determined so that the desired beam waist may be formed on the surface to be scanned from the luminescent size in a sub-scanning direction. As shown in FIG. 3(b), the deflecting surface and the surface to be scanned are geometrical-optically conjugative to each other by the focusing lens and the second cylindrical lens.

If the aforementioned relations are established and the refractive power of the respective lenses are determined so that the desired beam waist sizes $\omega_5$, $\omega'_5$ may be obtained on the surface to be scanned, an optical system for beam scanning may be obtained which has a falling correcting function and desired spot diameter in the main and sub scanning directions, respectively.

In the following, concrete examples will be illustrated with numerical values. Reference characters represent as follows:

In the main scanning direction:
$f_1$: focal length of coupling lens
$f_2$: focal length of focussing lens
$\omega_1$: radius of luminescent size in a main scanning direction
$\omega_2$: radius of beam waist by coupling lens
$\omega_5$: radius of beam waist on surface to be scanned by focusing lens
$s_1$: length from deflecting surface to focussing lens
$s_2$: length from coupling lens to deflecting surface
$d_1$: length from LD to coupling lens
$d_2$: length from coupling lens to $\omega_2$ In the sub-scanning direction:
$f_3$: focal length of first cylindrical lens
$f_4$: focal length of second cylindrical lens
$\omega'_2$: radius of luminescent size in a sub-scanning direction
$\omega'_2$: radius of beam waist by coupling lens
$\omega'_3$: radius of beam waist by first cylindrical lens
$\omega'_4$: radius of beam waist by focussing lens
$\omega'_5$: radius of beam waist on surface to be scanned by second cylindrical lens
$s_3$: length from coupling lens to first cylindrical lens
$d'_2$: length from coupling lens to $\omega'_2$
$d'_3$: $d'_3 = s_3 - d'_2$
$d'_4$: length from first cylindrical lens to $\omega'_3$
$d'_5$: $d'_5 = d'_4 - (s_2 - s_3) - s_1$
$d'_6$: length from coupling lens to $\omega'_4$
$d'_7$: length from $\omega'_4$ to second cylindrical lens
$d'_s$: length from second cylindrical lens to surface to be scanned $$d'_6 + d'_7 + d'_8 = f_2$$

For the focussing lens, a $f\theta$ lens of $f_2 = 271.3$ and $S_1 = 93.58$ is used, with the beam spot sizes on the surface to be scanned being $\omega_5 = 0.0525$ and $\omega'_5 = 0.06$. The oscillating wavelength of the semi-conductor laser is $\lambda = 780$ mm and the luminescent size is $1 \times 2$ µm.

In embodiment 1, the length $S_2$ from the coupling lens 2 to the deflecting surface 4 is made small to make the apparatus compact. In embodiment 2, since the semiconductor laser has a large diverging angle of beam, vignetting occurs in the coupling lens 2, and the beam waists $\omega_2$ and $\omega'_2$ by the coupling lens are assumed to be twice the theoretical value shown in the equation (1). In embodiment 3, the length from the coupling lens 2 to the deflector is large. In embodiment 4, the semi-conductor laser is rotated through 90°, and an active layer thereof is used at a position parallel to the main scanning surface.

|  | Design Example (1) $s_2$ is made small | (2) $\omega_2, \omega'_2$ are twice of theoretical value due to vignetting of coupling lens at (1) | $s_2$ is made large | LD is rotated by 90° at (1) |
|---|---|---|---|---|
| $f_1$ | 2.58403 | 1.29339 | 2.5868 | 5.1681 |
| $f_2$ | 271.3 | 271.3 | 271.3 | 271.3 |
| $\omega_1$ | 0.005 | 0.005 | 0.0005 | 0.001 |
| $\omega_2$ | 1.283 | 1.283 | 1.283 | 1.283 |
| $\omega_5$ | 0.0525 | 0.0525 | 0.0525 | 0.0525 |
| $s_1$ | 93.58 | 93.58 | 93.58 | 93.58 |
| $s_2$ | 100.0 | 100.0 | 500.0 | 100.0 |
| $d_1$ | 2.58402 | 1.29334 | 2.5869 | 5.1680 |
| $d_2$ | −77.718 | −77.718 | 322.281 | −77.718 |
| $f_3$ | 1331.8 | 1332.6 | 1017.4 | 5691.5 |
| $f_4$ | 23.584 | 23.561 | 30.402 | 6.226 |
| $\omega'_1$ | 0.001 | 0.001 | 0.001 | 0.0005 |
| $\omega'_2$ | 0.642 | 0.642 | 0.642 | 2.563 |
| $\omega'_3$ | 0.406 | 0.406 | 0.347 | 0.544 |
| $\omega'_4$ | 0.097 | 0.097 | 0.124 | 0.0258 |
| $\omega'_5$ | 0.06 | 0.06 | 0.06 | 0.06 |
| $s_3$ | 30.0 | 30.0 | 150.0 | 30.0 |
| $d'_2$ | −2.436 | −3.655 | 22.611 | −1317.9 |
| $d'_3$ | 32.436 | 33.655 | 127.389 | 1347.9 |
| $d'_4$ | 812.342 | 813.843 | 758.025 | 5495.8 |
| $d'_5$ | −648.757 | −650.259 | −314.440 | −5332.2 |
| $d'_6$ | 218.6 | 218.6 | 196.6 | 258.7 |
| $d'_7$ | 27.57 | 27.53 | 41.62 | 6.24 |
| $d'_8$ | 25.11 | 25.08 | 33.04 | 6.32 |

Figure 5:
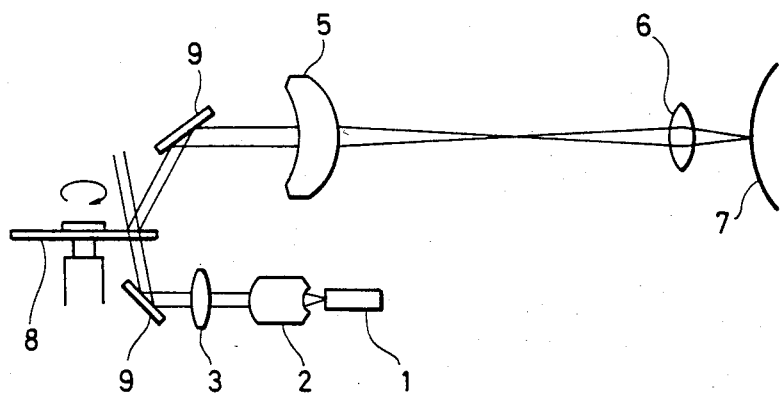
FIG. 5 is an optical arrangement of an embodiment which uses a hologram scanner as a light beam deflector.

FIG. 5 shows an example in which a hologram scanner 8 is used as a beam deflector, the reference numerals therein corresponding to those shown in FIG. 1. The numeral 9 indicates reflecting mirrors.

Figure 6:
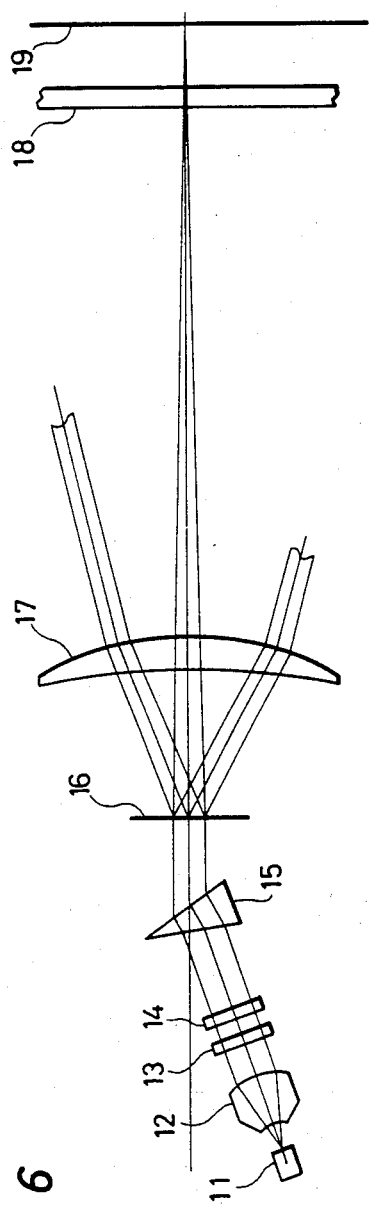
FIG. 6 is an optical arrangement in a main scanning direction of a light beam scanning apparatus having a spot size controlling optical system.
Figure 7:
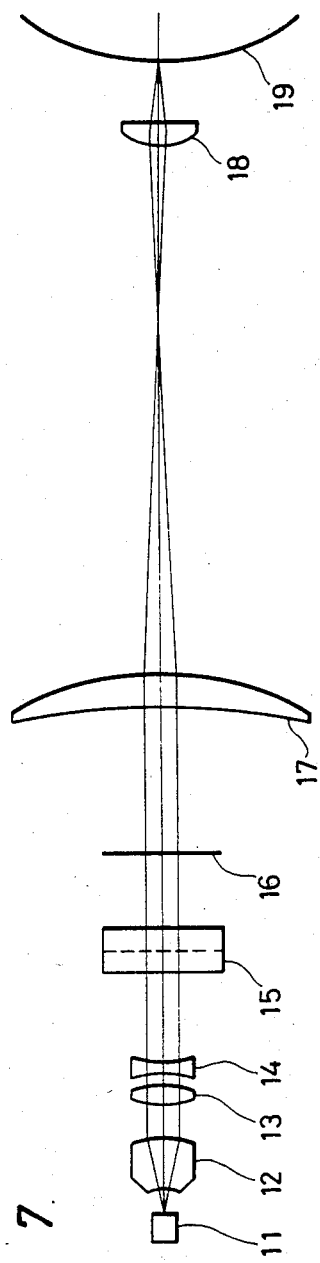
FIG. 7 is an optical arrangement in a sub-scanning direction of the same.

The embodiments shown in FIGS. 6 and 7 show one example of a scanner having an optical system for controlling a size of a beam spot. In the main scanning direction shown in FIG. 6, a semi-conductor laser 11 is placed in the vicinity of a focal point of a coupling lens 12, and an exit light from the semi-conductor laser 11 is formed into a substantially parallel beam at the coupling lens. First cylindrical lenses 13 and 14 have no refractive power in that direction, thereby not influencing the beam. Next, the beam is incident on a prism 15, and as is known, the exit light is varied in the width of the beam depending on the angle of incidence to the prism. This exit light is spot-formed on a surface to be scanned 19 by a $f\theta$ lens 17 for image formation through a deflecting surface 16 such as a rotating polygonal mirror.

Preferably, the prism is rotatable for adjustment of the beam width. In this case, the semi-conductor laser 11, coupling lens 12, first cylindrical lenses 13 and 14 are rotated together so that the beam is incident upon the same place of the deflecting surface at all times even if the prism is rotated.

In the sub-scanning direction shown in FIG. 7, the beam from the semi-conductor placed in the vicinity of the focal point position of the coupling lens is put out in the form of a substantially parallel beam from the coupling lens, in a manner similar to the main scanning direction. Next, a beam waist is formed in the vicinity or at the rear of the scanning surface 19 by the group of the first cylindrical lenses 13 and 14. Then, the beam passes through the prism 15 but no influence is given in this direction. A beam waist is formed frontwardly of the scanning surface by the coupling lens, and the beam is deflected at the deflecting surface 16. Finally, a beam spot as desired is formed on the scanning surface 19 by a second cylindrical lens 18 disposed in front of the scanning surface 19. At this time, the deflecting surface 16 and the scanning surface 19 are in a geometrical-optically conjugative relation by the focussing lens 17 and the second cylindrical lens 18, and therefore, displacement of the beam resulting from the surface falling of the deflecting surface may be corrected, as is known.

In this embodiment, the first cylindrical lens is split into a convex lens 13 and a concave lens 14, and the spacing between both lenses is varied to vary the focal length of the first cylindrical lens thereby absorbing irregularity of luminescent size of the semi-conductor light. At this time, the position of the second cylindrical lens 18 can also be fine-adjusted as necessary.

Concrete examples of such a scanning optical system will be illustrated with numerical values as follows:

The focal length of the coupling lens 12 is 5 mm and the focal length of $f\theta$ lens is 301 mm. A semi-conductor laser of luminescent size $1 \times 2$ μm and oscillating wavelength 780 mm is used. A beam spot is formed of 105 μm in a main scanning direction and 120 μm in a sub-scanning direction.

In this case, in the sub-scanning direction, the length from the coupling lens 12 to the $f\theta$ lens 17 is 202 mm, and a first cylindrical lens of focal length 3039.0 mm is arranged 10 mm from the coupling lens. Then, the beam from the semi-conductor laser arranged at the focal point position of the coupling lens passes through the $f\theta$ lens, after which a beam waist is formed at a place about 29 mm frontwardly of the scanning surface. When the second cylindrical lens 18 having the focal length of about 14 mm is disposed at a place about 14.5 mm frontwardly of the scanning surface, a beam spot of 120 μm is obtained on the scanning surface. At this time, the deflecting surface is positioned 102 mm from the $f\theta$ lens and is in a geometrical-optically conjugative relation by the $f\theta$ lens and the second cylindrical lens. On the other hand, in the main scanning direction, if the exit light from the coupling lens 12 is incident on the $f\theta$ lens 17 as a beam having the width 2.85 mm by beam width conversion by the prism 15, a spot size of 105 μm is obtained on the scanning surface.

As described above, in accordance with the present invention, a prism is used in a main scanning direction in which only the beam width is adjusted and two cylindrical lenses are used for the sub-scanning direction in which the beam waist position is also required so that the spacing therebetween may be varied to thereby change the resultant focal length. With this arrangement, the spot sizes in the main and sub scanning directions may be individually adjusted on the scanning surface by an extremely simple optical system.

What is claimed is:

1. A light beam scanning apparatus comprising a semi-conductor laser, a coupling lens for forming a beam from said laser into a substantially parallel beam, a beam deflector, and a focussing lens for condensing beams on a scanning surface, wherein first and second cylindrical lenses having a refractive power only in a sub-scanning direction are disposed between said coupling lens and a deflecting surface of the deflector and between the focussing lens and the scanning surface, respectively, and said deflecting surface and said scanning surface are in a geometrical-optically conjugative relation with respect to the coupling lens and said second cylindrical lens, the improvement wherein said first cylindrical lens comprises a positive lens and negative cylindrical lens, the spacing between which is variable to each other, a prism having a refractive power within a main scanning direction is disposed between said coupling lens and deflecting surface, and a beam spot size may be adjusted independently in the main scanning direction and sub-scanning direction.

* * * * *